US011312120B2

(12) United States Patent
Gupte et al.

(10) Patent No.: US 11,312,120 B2
(45) Date of Patent: Apr. 26, 2022

(54) LOW TEMPERATURE MULTILAYER SHRINK FILMS, AND METHODS OF MAKING THEREOF (71) Applicants: Dow Global Technologies LLC, Midland, MI (US); PBBPolisur S.R.L., Buenos Aires (AR)

(72) Inventors: Kaustubh Gupte, Mumbai (IN); Edward L. Lee, Singapore (SG); Marlos Giuntini De Oliveira, Sao Paulo (BR); Rajen M. Patel, Lake Jackson, TX (US); Guillermo A. Raimondi, Buenos Aires (AR); Prajwal Shah, Navi Mumbai (IN); Maximiliano Zanetti, Buenos Aires (AR)

(73) Assignees: Dow Global Technologies LLC, Midland, MI (US); PBBPolisur S.R.L., Buenos Aires (AR)

( * ) Notice: Subject to any disclaimer, the term of this patent is extended or adjusted under 35 U.S.C. 154(b) by 93 days.

(21) Appl. No.: 16/624,177

(22) PCT Filed: Jun. 29, 2018

(86) PCT No.: PCT/US2018/040169
§ 371 (c)(1),
(2) Date: Dec. 18, 2019

(87) PCT Pub. No.: WO2019/010071
PCT Pub. Date: Jan. 10, 2019

(65) Prior Publication Data
US 2020/0171809 A1    Jun. 4, 2020

(30) Foreign Application Priority Data
Jul. 6, 2017 (IN) ............................. 201741023793

(51) Int. Cl.
B32B 27/08    (2006.01)
B32B 27/32    (2006.01)

(52) U.S. Cl.
CPC .............. *B32B 27/32* (2013.01); *B32B 27/08* (2013.01); *B32B 2250/242* (2013.01); *B32B 2307/736* (2013.01); *B32B 2307/746* (2013.01)

(58) Field of Classification Search
CPC .............. B32B 27/32; B32B 2307/746; B32B 2307/736; B32B 2250/242; B32B 27/08;
(Continued)

(56) References Cited
U.S. PATENT DOCUMENTS 4,913,977 A    4/1990    Taka et al.
5,589,126 A    12/1996    Shih et al.
(Continued)

FOREIGN PATENT DOCUMENTS

EP    2653391 B1    7/2015
JP    11138713    5/1999
(Continued)

OTHER PUBLICATIONS

PCT/US2018/040169, International Search Report and Written Opinion dated Sep. 25, 2018.
(Continued)

*Primary Examiner* — Lee E Sanderson (57) ABSTRACT

A multilayer shrink film comprising at least one core layer positioned between a first skin layer and a second skin layer, wherein the multilayer shrink film comprising an ethylene/alpha-olefin interpolymer composition and a low density polyethylene.

9 Claims, 2 Drawing Sheets (58) Field of Classification Search
CPC ......... B32B 2323/046; B32B 2307/16; B32B 2307/72; B32B 2250/03; B32B 2250/04; B32B 2250/05; Y10T 428/1352; C08L 2203/16; C08L 23/08; C08L 23/0815; C08L 2205/025; C08J 2323/08; C08J 2423/06; C08J 5/18
USPC ................ 428/35.7, 35.9, 515, 516, 517
See application file for complete search history.

(56) References Cited

U.S. PATENT DOCUMENTS

| | | | |
|---|---|---|---|
| 6,270,866 | B1 | 8/2001 | Okuda et al. |
| RE38,694 | E | 2/2005 | Nelson |
| 7,179,521 | B2 | 2/2007 | Arthurs et al. |
| 7,235,607 | B2 | 6/2007 | Ohlsson |
| 2011/0003099 | A1 | 1/2011 | Vinck |
| 2011/0028065 | A1 | 2/2011 | Arcovio |
| 2012/0052270 | A1 | 3/2012 | Pittelli |
| 2015/0076022 | A1 | 3/2015 | Niedersuess et al. |

FOREIGN PATENT DOCUMENTS

| | | |
|---|---|---|
| JP | 2001145987 | 5/2001 |
| JP | 2002337231 | 11/2002 |
| JP | 2004017545 | 1/2004 |
| JP | 2004284161 | 10/2004 |
| JP | 2005170011 | 6/2005 |
| JP | 2007001102 | 1/2007 |
| JP | 2007136990 | 6/2007 |
| JP | 2008036844 | 2/2008 |
| JP | 2009039950 | 2/2009 |
| JP | 2012035466 | 2/2012 |
| WO | 2010111931 | 10/2010 |
| WO | 2013156532 | 10/2013 |
| WO | 2014081516 | 5/2014 |
| WO | 2014172350 | 10/2014 |
| WO | 2017058493 | 4/2017 |

OTHER PUBLICATIONS

PCT/US2018/International Preliminary Report on Patentability dated Jan. 7, 2020.
Lyondell Basell Technical Data Sheet of Lupolen 3220F (attached to SRWO).

LOW TEMPERATURE MULTILAYER SHRINK FILMS, AND METHODS OF MAKING THEREOF

FIELD

Embodiments of the present disclosure generally relate to polyethylene-based shrink films, and more particularly, to polyethylene-based shrink films having improved shrinkage at lower temperatures, and methods of making thereof.

BACKGROUND

Shrink packaging generally involves wrapping an article (s) in a shrink film to form a package, and then heat shrinking the film by exposing it to sufficient heat to cause shrinkage and intimate contact between the film and article. The heat can be provided by conventional heat sources, such as heated air. Conventional shrink films exhibit shrinkage at 140° C. However, to achieve such shrink temperatures, the shrink tunnels need to be operated at high temperatures. In certain applications, for e.g., pharmaceutical applications, high temperatures could adversely affect heat sensitive products. In addition, high shrink tunnel temperatures can lead to the deformation of PET bottles at the head space.

Accordingly, alternative polyethylene-based shrink films having improved shrinkage at lower temperatures are desired.

SUMMARY

Disclosed in embodiments herein are multilayer shrink films. In one embodiment, the multilayer shrink film comprises: a first skin layer comprising 25 to 60 wt. %, based on the total polymer weight in the first skin layer, of an ethylene/α-olefin interpolymer composition having a density in the range of from 0.890 g/cc to 0.915 g/cc, a melt index ($I_2$) in a range of from 0.1 to 5 g/10 minutes, a molecular weight distribution ($M_w/M_n$) in the range of from 1.8 to 3.5, and a Comonomer Distribution Constant (CDC) in the range of from 95 to 200; at least one core layer comprising from 15 to 85 wt. %, based on the total polymer weight in the at least one core layer, of an ethylene/α-olefin interpolymer composition having a density in the range of from 0.890 g/cc to 0.915 g/cc, a melt index ($I_2$) in a range of from 0.1 to 5 g/10 minutes, a molecular weight distribution ($M_w/M_n$) in the range of from 1.8 to 3.5, and a Comonomer Distribution Constant (CDC) in the range of from 95 to 200; and a second skin layer comprising from 25 to 60 wt. %, based on the total polymer weight in the second skin layer, of an ethylene/α-olefin interpolymer composition having a density in the range of from 0.890 g/cc to 0.915 g/cc, a melt index ($I_2$) in a range of from 0.1 to 5 g/10 minutes, a molecular weight distribution ($M_w/M_n$) in the range of from 1.8 to 3.5, and a Comonomer Distribution Constant (CDC) in the range of from 95 to 200; wherein the at least one core layer is positioned between the first skin layer and the second skin layer; wherein the wt. % amount of the ethylene/alpha-olefin interpolymer composition present in the first skin layer is different from the wt. % amount of the ethylene/alpha-olefin interpolymer composition present in the core layer, and the wt. % amount of the ethylene/alpha-olefin interpolymer composition present in the second skin layer is different from the wt. % amount of the ethylene/alpha-olefin interpolymer composition present in the core layer; wherein the multilayer shrink film comprises from 25 wt. % to 75 wt. %, based on the total weight of polymers present in the multilayer shrink film, of the ethylene/alpha-olefin interpolymer composition; and wherein the multilayer shrink film further comprises from 30 to 55 wt. %, based on the total weight of polymers present in the multilayer shrink film, of a low density polyethylene polymer having a density from 0.910 to 0.930 g/cc and an $I_2$ from 0.1 to 10 g/10 min.

Also disclosed in embodiments herein are methods of making a multilayer shrink film. In another embodiment, the method comprises co-extruding a first skin layer composition, second skin layer composition, and at least one core layer composition in an extruder to form a tube having a first skin layer formed from the first skin layer composition, second skin layer formed from the second skin layer composition, and at least one core layer formed from the at least one core layer composition; and cooling the tube to form a multilayer shrink film; wherein the first skin layer composition comprises from 25 to 60 wt. %, based on the total polymer weight in the first skin layer, of an ethylene/α-olefin interpolymer composition having a density in the range of from 0.890 g/cc to 0.915 g/cc, a melt index ($I_2$) in a range of from 0.1 to 5 g/10 minutes, a molecular weight distribution ($M_w/M_n$) in the range of from 1.8 to 3.5, and a Comonomer Distribution Constant (CDC) in the range of from 95 to 200; the second skin layer composition comprises from 25 to 60 wt. %, based on the total polymer weight in the second skin layer, of an ethylene/α-olefin interpolymer composition having a density in the range of from 0.890 g/cc to 0.915 g/cc, a melt index ($I_2$) in a range of from 0.1 to 5 g/10 minutes, a molecular weight distribution ($M_w/M_n$) in the range of from 1.8 to 3.5, and a Comonomer Distribution Constant (CDC) in the range of from 95 to 200; and the at least one core layer composition comprises from 15 to 85 wt. %, based on the total polymer weight in the at least one core layer, of an ethylene/α-olefin interpolymer composition having a density in the range of from 0.890 g/cc to 0.915 g/cc, a melt index ($I_2$) in a range of from 0.1 to 5 g/10 minutes, a molecular weight distribution ($M_w/M_n$) in the range of from 1.8 to 3.5, and a Comonomer Distribution Constant (CDC) in the range of from 95 to 200; wherein the at least one core layer is positioned between the first skin layer and the second skin layer; wherein the wt. % amount of the ethylene/alpha-olefin interpolymer composition present in the first skin layer is different from the wt. % amount of the ethylene/alpha-olefin interpolymer composition present in the core layer, and the wt. % amount of the ethylene/alpha-olefin interpolymer composition present in the second skin layer is different from the wt. % amount of the ethylene/alpha-olefin interpolymer composition present in the core layer; wherein the multilayer shrink film comprises from 25 wt. % to 75 wt. %, based on the total weight of polymers present in the multilayer shrink film, of the ethylene/alpha-olefin interpolymer composition; and wherein the multilayer shrink film further comprises from 30 to 55 wt. %, based on the total weight of polymers present in the multilayer shrink film, of a low density polyethylene polymer having a density from 0.910 to 0.930 g/cc and an $I_2$ from 0.1 to 10 g/10 min.

In an embodiment, the multilayer shrink film according to any of the preceding embodiments, wherein the ethylene/α-olefin interpolymer composition present in the first skin layer, the at least one core layer, and the second skin layer has a vinyl unsaturation of less than 0.15 vinyls per one thousand carbon atoms present in the ethylene/α-olefin interpolymer composition; and a zero shear viscosity ratio (ZSVR) in the range from 2 to 20.

In an embodiment, the multilayer shrink film according to any of the preceding embodiments, wherein the ethylene/α- olefin interpolymer present in the first skin layer, the at least one core layer, and the second skin layer has an $I_{10}/I_2$ from 6 to 12.

In an embodiment, the multilayer shrink film according to any of the preceding embodiments, wherein the first skin layer and the second skin layer independently have a thickness that is from 5-35 percent of the overall thickness of the multilayer shrink film.

In an embodiment, the multilayer shrink film according to any of the preceding embodiments, wherein the at least one core layer has a thickness that is from 30-90 percent of the overall thickness of the multilayer shrink film.

In an embodiment, the multilayer shrink film according to any of the preceding embodiments, wherein the film has an overall thickness ranging from 20 to 100 microns.

In an embodiment, the multilayer shrink film according to any of the preceding embodiments, wherein the film exhibits a CD shrinkage higher than 4% at 120° C., according to ASTM D2732.

In an embodiment, the multilayer shrink film according to any of the preceding embodiments, wherein the film exhibits a CD shrinkage higher than 6% at 120° C., according to ASTM D2732.

In an embodiment, the multilayer shrink film according to any of the preceding embodiments, wherein the film further comprises one or more additives selected from the group consisting of antiblocking agents, processing aids, slip agents, colors or pigments, and fillers Additional features and advantages of the embodiments will be set forth in the detailed description which follows, and in part will be readily apparent to those skilled in the art from that description or recognized by practicing the embodiments described herein, including the detailed description and the claims. It is to be understood that both the foregoing and the following description describe various embodiments and are intended to provide an overview or framework for understanding the nature and character of the claimed subject matter.

DETAILED DESCRIPTION

Reference will now be made in detail to embodiments of multilayer shrink films, and methods thereof. The multilayer shrink films may be used in the packaging of multiple articles. It is noted, however, that this is merely an illustrative implementation of the embodiments disclosed herein. The embodiments are applicable to other technologies that are susceptible to similar problems as those discussed above. For example, the multilayer shrink films described herein may be used in other flexible packaging applications, such as, heavy duty shipping sacks, liners, sacks, stand-up pouches, detergent pouches, sachets, etc., all of which are within the purview of the present embodiments.

The multilayer shrink films described herein are polyethylene-based or ethylene-based. The term "polyethylene-based" or "ethylene-based," are used interchangeably herein to mean that the film contains greater than 50 wt. %, at least 60 wt. %, at least 70 wt. %, at least 75 wt. %, at least 80 wt. %, at least 85 wt. %, at least 90 wt. %, at least 95 wt. %, at least 99 wt. %, at least 100 wt. %, based on the total polymer weight present in the films, of polyethylene polymers.

In embodiments herein, the multilayer shrink films comprise a first skin layer, at least one core layer, and a second skin layer. The at least one core layer is positioned between the first skin layer and the second skin layer. The first and second skin layers may be the same or different, and may have an ABA film structure, where A indicates that the first and second skin layers are the same in the composition, or an ABC film structure, where A and C indicated that the first and second skin layers are different in composition. In either configuration (ABA or ABC), the first and second skin layers may have an equal thickness, or alternatively, may have an unequal thickness.

The multilayer shrink films described herein may have a film thickness of 20 to 100 microns. All individual values and subranges are included and disclosed herein. For example, in some embodiments, the multilayer films described herein may have a film thickness ranging from 20 to 95 microns, 20 to 90 microns, 20 to 85 microns, 20 to 80 microns, 20 to 75 microns, from 20 to 72 microns, from 25 to 72 microns, from 25 to 70 microns, or from 30 to 70 microns.

The first skin layer and the second skin layer may independently have a thickness that is from 5-35 percent of the overall thickness of the multilayer shrink film. In some embodiments, the first skin layer and the second skin layer may independently have a thickness that is from 10-35 percent, 10-30 percent, 15-25 percent, or 20-25 percent of the overall thickness of the multilayer shrink film. The at least one core layer has a thickness that is from 30-90 percent of the overall thickness of the multilayer shrink film. In some embodiments, the at least one core layer has a thickness that is from 40-90 percent, 50-90 percent, 50-85 percent, 50-80 percent, 50-75 percent, 50-70 percent, or 50-65 percent of the overall thickness of the multilayer shrink film. In other embodiments, the at least one core layer has a thickness that is from 55-90 percent, 60-90 percent, 65-90 percent, 70-90 percent, or 75-90 percent of the overall thickness of the multilayer shrink film.

The thickness ratio of the first skin layer and the second skin layer to the at least one core layer can be any ratio suitable to maintain the optical and mechanical properties of a shrink film. In some embodiments, the thickness ratio of the first skin layer and the second skin layer to the at least one core layer may be 1:5 to 1:1, 1:4 to 1:1, 1:3 to 1:1, 1:2 to 1:1, or 1:1.5 to 1:1.

The first skin layer comprises from 25 to 60 wt. %, based on the total polymer weight in the first skin layer, of an ethylene/α-olefin interpolymer composition. All individual values and subranges described above are included and disclosed herein. For example, in some embodiments, the first skin layer may comprise 25 to 55 wt. %, 30 to 55 wt. %, 35 to 55 wt. %, or 40 to 55 wt. % of the ethylene/α-olefin interpolymer composition. In other embodiments, the first skin layer may comprise 25 to 50 wt. %, 25 to 45 wt. %, or 25 to 40 wt. % of the ethylene/α-olefin interpolymer composition.

The second skin layer comprises from 25 to 60 wt. %, based on the total polymer weight in the second skin layer, of an ethylene/α-olefin interpolymer composition. All individual values and subranges described above are included and disclosed herein. For example, in some embodiments, the second skin layer may comprise 25 to 55 wt. %, 30 to 55 wt. %, 35 to 55 wt. %, or 40 to 55 wt. % of the ethylene/α-olefin interpolymer composition. In other embodiments, the second skin layer may comprise 25 to 50 wt. %, 25 to 45 wt. %, or 25 to 40 wt. % of the ethylene/α-olefin interpolymer composition. As previously described herein, the first skin layer and the second skin layer may have the same composition or may have a different composition, including the same or differing amounts of the ethylene/α-olefin interpolymer composition.

The at least one core layer comprises from 15 to 85 wt. %, based on the total polymer weight in the at least one core layer, of an ethylene/α-olefin interpolymer composition. All individual values and subranges described above are included and disclosed herein. For example, in some embodiments, the at least one core layer may comprise 25 to 85 wt. %, 30 to 85 wt. %, 35 to 85 wt. %, 40 to 85 wt. %, or 45 to 85 wt. % of the ethylene/α-olefin interpolymer composition. In other embodiments, the at least one core layer may comprise 25 to 75 wt. %, 25 to 65 wt. %, or 25 to 50 wt. % of the ethylene/α-olefin interpolymer composition.

The wt. % amount of the ethylene/alpha-olefin interpolymer composition present in the first skin layer is different from the wt. % amount of the ethylene/alpha-olefin interpolymer composition present in the at least one core layer. Also, the wt. % amount of the ethylene/alpha-olefin interpolymer composition present in the second skin layer is different from the wt. % amount of the ethylene/alpha-olefin interpolymer composition present in the at least one core layer. The multilayer shrink film comprises from 25 wt. % to 75 wt. %, based on the total weight of polymers present in the multilayer shrink film, of the ethylene/alpha-olefin interpolymer composition. All individual values and subranges described above are included and disclosed herein. For example, in some embodiments, the wherein the multilayer shrink film comprises from 30 wt. % to 75 wt. %, from 35 wt. % to 75 wt. %, or from 40 wt. % to 75 wt. %, based on the total weight of polymers present in the multilayer shrink film, of the ethylene/alpha-olefin interpolymer composition. The multilayer shrink film further comprises from 30 to 55 wt. %, based on the total weight of polymers present in the multilayer shrink film, of a low density polyethylene polymer. All individual values and subranges described above are included and disclosed herein. For example, in some embodiments, the multilayer shrink film further comprises from 35 to 55 wt. %, based on the total weight of polymers present in the multilayer shrink film, of a low density polyethylene polymer.

Ethylene/α-Olefin Interpolymer Composition

The ethylene/α-olefin interpolymer composition comprises (a) less than or equal to 100 percent, for example, at least 70 percent, at least 75 percent, at least 80 percent, at least 85 percent, at least 90 percent, or at least 92 percent, by weight of the units derived from ethylene; and (b) less than 30 percent, for example, less than 25 percent, less than 20 percent, less than 15 percent, less than 10 percent, or less than 8 percent, by weight of units derived from one or more α-olefin comonomers. The term "ethylene/α-olefin interpolymer composition" refers to a polymer that contains more than 50 mole percent polymerized ethylene monomer (based on the total amount of polymerizable monomers) and, optionally, may contain at least one comonomer. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference The α-olefin comonomers have no more than 20 carbon atoms. For example, the α-olefin comonomers may have 3 to 10 carbon atoms, or 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

In embodiments herein, the ethylene/α-olefin interpolymer composition has a density in the range of 0.890 to 0.915 g/cc. All individual values and subranges from 0.890 to 0.915 g/cc are included and disclosed herein. For example, in some embodiments, the ethylene/α-olefin interpolymer composition has a density from a lower limit of 0.890, 0.895, or 0.900 g/cc to an upper limit of 0.915, 0.912, 0.910, 0.908, or 0.905 g/cc.

In addition to the density, the ethylene/α-olefin interpolymer composition has a melt index ($I_2$) in a range of from 0.1 to 5 g/10 minutes. All individual values and subranges from 0.1 to 5 g/10 minutes are included and disclosed herein. For example, in some embodiments, the ethylene/α-olefin interpolymer composition has a melt index ($I_2$) ranging from a lower limit of 0.1, 0.2, 0.5, or 0.8 g/10 minutes to an upper limit of 1.2, 1.5, 1.8, 2.0, 2.2, 2.5, 3.0, 4.0, 4.5 or 5.0 g/10 minutes.

In addition to the density and melt index (I2), the ethylene/α-olefin interpolymer composition has a molecular weight distribution ($M_w/M_n$) in the range of from 1.8 to 3.5. All individual values and subranges from 1.8 to 3.5 are included and disclosed herein. For example, in some embodiments, the ethylene/α-olefin interpolymer composition has a molecular weight distribution ($M_w/M_n$) ranging from a lower limit of 1.8, 2, 2.1, or 2.2 to an upper limit of 2.5, 2.7, 2.9, 3.2, or 3.5.

In addition to the density, melt index (I2), and molecular weight distribution ($M_w/M_n$), the ethylene/α-olefin interpolymer composition has a Comonomer Distribution Constant (CDC) in the range of from 95 to 200. All individual values and subranges from 95 to 200 are included and disclosed herein. For example, in some embodiments, the ethylene/α-olefin interpolymer composition has a CDC from 95 to 175, from 95 to 150, or from 95 to 125.

In addition to the density, melt index (I2), molecular weight distribution ($M_w/M_n$), and the CDC, the ethylene/α-olefin interpolymer composition may have a vinyl unsaturation of less than 0.15 vinyls per one thousand carbon atoms present in the ethylene/α-olefin interpolymer composition. In addition to the density, melt index ($I_2$), molecular weight distribution ($M_w/M_n$), CDC, and vinyl unsaturation, the ethylene/α-olefin interpolymer composition may have a zero shear viscosity ratio (ZSVR) in the range of from 2 to 20, for example, from 2 to 10, from 2 to 6, or from 2.5 to 4.

In addition to the density, melt index (I2), molecular weight distribution ($M_w/M_n$), CDC, vinyl unsaturation, and ZSVR, the ethylene/α-olefin interpolymer composition may have a melt index ratio, 110/12, of from 6 to 12. All individual values and subranges are included and disclosed herein. For example, the ethylene/α-olefin interpolymer composition may have a melt index ratio, 110/12, of from 6 to 11, from 6.5 to 11, from 7 to 11, from 7 to 10, or from 7.5 to 10.

In addition to the density, melt index (I2), molecular weight distribution ($M_w/M_n$), CDC, vinyl unsaturation, ZSVR, and melt index ratio ($I_{1042}$), the ethylene/α-olefin interpolymer composition may have a molecular weight (Mw) in the range of 50,000 to 250,000 g/mole. For example, the molecular weight (Mw) can be from a lower limit of 50,000, 60,000, 70,000 g/mole to an upper limit of 150,000, 180,000, 200,000 or 250,000 g/mole.

In addition to the density, melt index (I2), molecular weight distribution ($M_w/M_n$), CDC, vinyl unsaturation, ZSVR, melt index ratio (I10/I2), and Mw, the ethylene/α-olefin interpolymer composition may have a molecular weight distribution (Mz/Mw) in the range of less than 4, less than 3.75, less than 3.5, less than 3.25, less than 3, or from 1.8 to 3.8, from 1.8 to 3.5, from 1.8 to 3.3, from 1.8 to 3.0, from 2.0 to 3.0, or from 2.0 to 2.8.

In addition to the density, melt index (I2), molecular weight distribution ($M_w/M_n$), CDC, vinyl unsaturation, ZSVR, melt index ratio (I10/I2), Mw, and the Mz/Mw, the ethylene/α-olefin interpolymer composition may have a vicat softening point (° C.) of less than 98° C. All individual values and subranges less than 98° C. are included and disclosed herein. For example, in some embodiments, the ethylene/α-olefin interpolymer composition may have a vicat softening point (° C.) of less than 97° C., less than 96° C., or less than 95.5° C. In other embodiments, the ethylene/α-olefin interpolymer composition may have a vicat softening point (° C.) ranging from 70° C. to less than 98° C., from 70° C. to 97° C., or from 70° C. to 96° C.

In addition to the density, melt index (I2), molecular weight distribution ($M_w/M_n$), CDC, vinyl unsaturation, ZSVR, melt index ratio (I10/I2), Mw, Mz/Mw, and vicat softening point, the ethylene/α-olefin interpolymer composition may have a peak melting point temperature (° C.) of less than 123° C. All individual values and subranges less than 123° C. are included and disclosed herein. For example, in some embodiments, the ethylene/α-olefin interpolymer composition may have a peak melting point temperature (° C.) of less than 120° C., less than 115° C., less than 110° C., or less than 105° C. In other embodiments, the ethylene/α-olefin interpolymer composition may have a peak melting point temperature (° C.) ranging from 90° C. to less than 120° C., from 90° C. to 115° C., or from 90° C. to 110° C.

Any conventional ethylene (co)polymerization reaction processes may be employed to produce the ethylene/α-olefin interpolymer composition. Such conventional ethylene (co) polymerization reaction processes include, but are not limited to, gas phase polymerization process, slurry phase polymerization process, solution phase polymerization process, and combinations thereof using one or more conventional reactors, e.g. fluidized bed gas phase reactors, loop reactors, stirred tank reactors, batch reactors in parallel, series, and/or any combinations thereof. Examples of suitable polymerization processes are described in U.S. Pat. Nos. 6,982,311, 6,486,284, 8,829,115 or 8,327,931, which are incorporated herein by reference.

Low Density Polyethylene (LDPE)

The low density polyethylene has a density of from 0.910 g/cc to 0.930 g/cc. All individual values and subranges are included and disclosed herein. For example, in some embodiments, the low density polyethylene may have a density of from 0.912 g/cc to 0.930 g/cc, 0.915 g/cc to 0.930 g/cc, 0.915 g/cc to 0.927 g/cc, 0.917 g/cc to 0.930 g/cc, 0.917 g/cc to 0.927 g/cc, or 0.919 g/cc to 0.925 g/cc. In addition to the density, the low density polyethylene has a melt index, or I2, of from 0.1 g/10 min to 10 g/10 min. All individual values and subranges are included and disclosed herein. For example, in some embodiments, the low density polyethylene may have a melt index from 0.1 to 7 g/10 min, 0.1 to 5 g/10 min, 0.1 to 4 g/10 min, 0.1 to 3.5 g/10 min, 0.1 to 3 g/10 min, 0.1 to 2.5 g/10 min, 0.1 to 2 g/10 min, 0.1 to 1.5 g/10 min. In other embodiments, the LDPE has a melt index from 0.1 g/10 min to 1.1 g/10 min. In further embodiments, the LDPE has a melt index of 0.1-0.9 g/10 min.

In addition to the density and melt index (I2), the low density polyethylene may have a melt strength of from 10 cN to 35 cN. All individual values and subranges are included and disclosed herein. For example, in some embodiments, the low density polyethylene may have a melt strength of from 10 cN to 30 cN, from 10 cN to 28 cN, from 10 cN to 25 cN, from 10 cN to 20 cN, or from 10 cN to 18 cN. In other embodiments, the low density polyethylene may have a melt strength of from 12 cN to 30 cN, from 15 cN to 30 cN, from 18 cN to 30 cN, from 20 cN to 30 cN, or from 22 cN to 30 cN. In further embodiments, the low density polyethylene may have a melt strength of from 12 cN to 28 cN, from 12 cN to 25 cN, from 15 cN to 25 cN, from 15 cN to 23 cN, or from 17 cN to 23 cN.

In addition to the density, melt index ($I_2$), and melt strength, the low density polyethylene may have a molecular weight distribution (MWD or Mw/Mn) of from 5 to 20. All individual values and subranges are included and disclosed herein. For example, in some embodiments, the low density polyethylene may have a MWD of from 5 to 18, from 5 to 15, from 5 to 12, from 5 to 10, or from 5 to 8. In other embodiments, the low density polyethylene may have a MWD of from 8 to 20, from 10 to 20, from 12 to 20, from 15 to 20, or from 17 to 20. In further embodiments, the low density polyethylene may have a MWD of from 8 to 18, from 8 to 15, from 10 to 18, or from 10 to 15. The MWD may be measured according to the triple detector gel permeation chromatography (TDGPC) test method outlined below.

The LDPE may include branched polymers that are partly or entirely homopolymerized or copolymerized in autoclave and/or tubular reactors, or any combination thereof, using any type of reactor or reactor configuration known in the art, at pressures above 14,500 psi (100 MPa) with the use of free-radical initiators, such as peroxides (see for example U.S. Pat. No. 4,599,392, herein incorporated by reference). In some embodiments, the LDPE may be made in an autoclave process under single phase conditions designed to impart high levels of long chain branching, such as described in PCT patent publication WO 2005/023912, the disclosure of which is incorporated herein. Examples of suitable LDPEs may include, but are not limited to, ethylene homopolymers, and high pressure copolymers, including ethylene interpolymerized with, for example, vinyl acetate, ethyl acrylate, butyl acrylate, acrylic acid, methacrylic acid, carbon monoxide, or combinations thereof. The ethylene may also be interpolymerized with an alpha-olefin comonomer, for example, at least one C3-C20 alpha-olefin, such as propylene, isobutylene, 1-butene, 1-pentene, 1-hexene, and mixtures thereof. Exemplary LDPE resins may include, but are not limited to, resins sold by The Dow Chemical Company, such as, LDPE 1321 resins, LDPE 6211 resins, LDPE 6621 resins, or AGILITY™ 1000 and 2001 resins, resins sold by Westlake Chemical Corporation (Houston, Tex.), such as EF412, EF602, EF403, or EF601, resins sold by LyondellBasell Industries (Houston, Tex.), such as, PETROTHENE™ M2520 or NA940, and resins sold by The ExxonMobil Chemical Company (Houston, Tex.) such as, LDPE LD 051.LQ or NEXXSTAR™ LDPE-00328. Other exemplary LDPE resins are described in WO 2014/051682 and WO 2011/019563, which are herein incorporated by reference.

Multilayer Shrink Films

The first skin layer, second skin layer, and/or the at least one core layer of the multilayer shrink films described herein may further incorporate optional polymers and additives. Exemplary optional polymers may include a medium density polyethylene (MDPE), a high density polyethylene (HDPE), or combinations thereof. In some embodiments, the first skin layer, second skin layer, and/or the at least one core layer of the multilayer shrink film may comprise from 0.5 to 30%, by weight of the polymer composition, of MDPE. All individual values and subranges from 0.5 to 30% are included and disclosed herein. For example, in some embodiments, the first skin layer, second skin layer, and/or the at least one core layer of the multilayer shrink film may comprise from 1 to 30%, 1 to 20%, 1 to 15%, 1 to 10%, by weight of the polymer composition, of MDPE. In further embodiments, the first skin layer, second skin layer, and/or the at least one core layer of the multilayer shrink film may further comprise from 5 to 10%, by weight of the polymer composition, of MDPE.

In some embodiments, the first skin layer, second skin layer, and/or the at least one core layer of the multilayer shrink film may comprise from 0.5 to 30%, by weight of the polymer composition, of HDPE. All individual values and subranges from 0.5 to 30% are included and disclosed herein. For example, in some embodiments, the first skin layer, second skin layer, and/or the at least one core layer of the multilayer shrink film may comprise from 1 to 30%, 1 to 20%, 1 to 15%, 1 to 10%, by weight of the polymer composition, of HDPE. In further embodiments, the first skin layer, second skin layer, and/or the at least one core layer of the multilayer shrink film may further comprise from 5 to 10%, by weight of the polymer composition, of HDPE.

Exemplary additives may include, but are not limited to, antistatic agents, color enhancers, dyes, lubricants, fillers such as TiO2 or CaCO3, opacifiers, nucleators, processing aids, pigments, primary antioxidants, secondary antioxidants, processing aids, UV stabilizers, anti-blocks, slip agents, tackifiers, fire retardants, anti-microbial agents, odor reducer agents, antifungal agents, and combinations thereof. The multilayer shrink film may contain from about 0.1 to about 10 percent by the combined weight of such additives, based on the total weight of materials present in the multilayer shrink film. In some embodiments, the multilayer shrink films described herein further comprise one or more additives selected from the group consisting of antiblocking agents, processing aids, slip agents, colors or pigments, and fillers.

In some embodiments, the multilayer shrink films described herein may exhibit a CD shrinkage higher than 4% at 120° C., according to ASTM D2732 or a CD shrinkage higher than 6% at 120° C., according to ASTM D2732.

The multilayer films described herein can be made by a variety of techniques, such as, blown film techniques. Methods of making multilayer blown films are described in U.S. Pat. No. 6,521,338 (Maka), the entirety of which patent is incorporated herein by reference. For example, in some embodiments, a multilayer shrink film can be made by co-extruding a first skin layer composition, second skin layer composition, and at least one core layer composition in an extruder to form a tube having a first skin layer formed from the first skin layer composition, second skin layer formed from the second skin layer composition, and at least one core layer formed from the at least one core layer composition; and cooling the tube to form a multilayer shrink film.

The first skin layer composition comprises from 25 to 60 wt. %, based on the total polymer weight in the first skin layer, of an ethylene/α-olefin interpolymer composition having a density in the range of from 0.890 g/cc to 0.915 g/cc, a melt index ($I_2$) in a range of from 0.1 to 5 g/10 minutes, a molecular weight distribution ($M_w/M_n$) in the range of from 1.8 to 3.5, and a Comonomer Distribution Constant (CDC) in the range of from 95 to 200; the second skin layer composition comprises from 25 to 60 wt. %, based on the total polymer weight in the second skin layer, of an ethylene/α-olefin interpolymer composition having a density in the range of from 0.890 g/cc to 0.915 g/cc, a melt index ($I_2$) in a range of from 0.1 to 5 g/10 minutes, a molecular weight distribution ($M_w/M_n$) in the range of from 1.8 to 3.5, and a Comonomer Distribution Constant (CDC) in the range of from 95 to 200; and the at least one core layer composition comprises from 15 to 85 wt. %, based on the total polymer weight in the at least one core layer, of an ethylene/α-olefin interpolymer composition having a density in the range of from 0.890 g/cc to 0.915 g/cc, a melt index ($I_2$) in a range of from 0.1 to 5 g/10 minutes, a molecular weight distribution ($M_w/M_n$) in the range of from 1.8 to 3.5, and a Comonomer Distribution Constant (CDC) in the range of from 95 to 200; wherein the at least one core layer is positioned between the first skin layer and the second skin layer; wherein the wt. % amount of the ethylene/alpha-olefin interpolymer composition present in the first skin layer is different from the wt. % amount of the ethylene/alpha-olefin interpolymer composition present in the core layer, and the wt. % amount of the ethylene/alpha-olefin interpolymer composition present in the second skin layer is different from the wt. % amount of the ethylene/alpha-olefin interpolymer composition present in the core layer; wherein the multilayer shrink film comprises from 25 wt. % to 75 wt. %, based on the total weight of polymers present in the multilayer shrink film, of the ethylene/alpha-olefin interpolymer composition; and wherein the multilayer shrink film further comprises from 30 to 55 wt. %, based on the total weight of polymers present in the multilayer shrink film, of a low density polyethylene polymer having a density from 0.910 to 0.930 g/cc and an $I_2$ from 0.1 to 10 g/10 min Test Methods Unless otherwise stated, the following test methods are used.

Density

Density can be measured in accordance with ASTM D-792.

Melt Index

Melt index ($I_2$) can be measured in accordance with ASTM D-1238, Procedure B (condition 190° C./2.16 kg). Melt index ($I_{10}$) can be measured in accordance with ASTM D-1238, Procedure B (condition 190° C./10.0 kg).

Vicat Softening Point

Vicat softening point may be measured in accordance with ASTM D-1525.

Gel Permeation Chromatography (GPC)

The chromatographic system consisted of a PolymerChar GPC-IR (Valencia, Spain) high temperature GPC chromatograph equipped with an internal IR5 detector. The autosampler oven compartment was set at 160° Celsius and the column compartment was set at 150° Celsius. The columns used were 3 Agilent "Mixed B" 30 cm 10-micron linear mixed-bed columns and a 10-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)).:

$$M_{polyethylene} = A \times (M_{polystyrene})^B \quad (EQ1)$$

where M is the molecular weight, A has a value of 0.4315 and B is equal to 1.0.

A fifth order polynomial was used to fit the respective polyethylene-equivalent calibration points. A small adjustment to A (from approximately 0.415 to 0.44) was made to correct for column resolution and band-broadening effects such that NIST standard NBS 1475 is obtained at 52,000 Mw.

The total plate count of the GPC column set was performed with Eicosane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{RV_{Peak\ Max}}{\text{Peak Width at } \frac{1}{2} \text{height}} \right)^2 \quad (EQ\ 2)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad (EQ\ 3)$$

where RV is the retention volume in milliliters and the peak width is in milliliters, Peak max is the maximum position of the peak, one tenth height is ⅒ height of the peak maximum, rear peak refers to the peak tail at later retention volumes than the peak max, and front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre-nitrogen-sparged septa-capped vial, via the PolymerChar high temperature autosampler. The samples were dissolved for 2 hours at 160° Celsius under "low speed" shaking.

The calculations of Mn, Mw, and Mz were based on GPC results using the internal IRS detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$M_n = \frac{\sum\limits_{i} IR_i}{\sum\limits_{i} (IR_i / M_{polyethylene_i})} \quad (EQ\ 4)$$

$$M_w = \frac{\sum\limits_{i} (IR_i * M_{polyethylene_i})}{\sum\limits_{i} IR_i} \quad (EQ\ 5)$$

$$M_z = \frac{\sum\limits_{i} (IR_i * M_{polyethylene_i}^2)}{\sum\limits_{i} (IR_i * M_{polyethylene_i})} \quad (EQ\ 6)$$

In order to monitor the deviations over time, a flowrate marker (decane) was introduced into each sample via a micropump controlled with the PolymerChar GPC-IR system. This flowrate marker was used to linearly correct the flowrate for each sample by alignment of the respective decane peak within the sample to that of the decane peak within the narrow standards calibration. Any changes in the time of the decane marker peak are then assumed to be related to a linear shift in both flowrate and chromatographic slope. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (as a measurement of the calibration slope) is calculated as Equation 7. Processing of the flow marker peak was done via the PolymerChar GPCOne™ Software.

$$\text{Flowrate}_{effective} = \text{Flowrate}_{nominal} \times \frac{FlowMarker_{Calibration}}{FlowMarker_{Observed}} \quad (EQ\ 7)$$

Comonomer Distribution Constant (CDC) Method

Comonomer distribution constant (CDC) is calculated from comonomer distribution profile by CEF. CDC is defined as Comonomer Distribution Index divided by Comonomer Distribution Shape Factor multiplying by 100 as shown in the following equation:

$$CDC = \frac{\text{Comonomer Distribution Index}}{\text{Comonomer Distribution Shape Factor}} = \frac{\text{Comonomer Distribution Index}}{\text{Half Width}/Stdev} \times 100$$

wherein Comonomer distribution index stands for the total weight fraction of polymer chains with the comonomer content ranging from 0.5 of median comonomer content ($C_{median}$) and 1.5 of $C_{median}$ from 35.0 to 119.0° C. Comonomer Distribution Shape Factor is defined as a ratio of the half width of comonomer distribution profile divided by the standard deviation of comonomer distribution profile from the peak temperature ($T_p$).

CDC is calculated according to the following steps:

(A) Obtain a weight fraction at each temperature (T) ($w_T(T)$) from 35.0° C. to 119.0° C. with a temperature step increase of 0.200° C. from CEF according to the following Equation:

$$\int_{35.0}^{119.0} W_T(T) dT = 1$$

(B) Calculate the median temperature ($T_{median}$) at cumulative weight fraction of 0.500, according to the following Equation:

$$\int_{35.0}^{T_{median}} W_T(T) dT = 0.5$$

(C) Calculate the corresponding median comonomer content in mole % ($C_{median}$) at the median temperature ($T_{median}$) by using comonomer content calibration curve according to the following Equation:

$$\ln(1 - \text{comonomer content}) = -\frac{207.26}{273.12 + T} + 0.5533$$

$$R^2 = 0.997$$

(D) Construct a comonomer content calibration curve by using a series of reference materials with known amount of comonomer content, i.e., eleven reference materials with narrow comonomer distribution (mono-modal comonomer distribution in CEF from 35.0 to 119.0° C.) with weight average $M_w$ of 35,000 to 115,000 (measured via conventional GPC) at a comonomer content ranging from 0.0 mole % to 7.0 mole % are analyzed with CEF at the same experimental conditions specified in CEF experimental sections;

(E) Calculate comonomer content calibration by using the peak temperature ($T_p$) of each reference material and its comonomer content; The calibration is calculated from each reference material according to the following Equation:

$$\ln(1 - \text{comonomer content}) = -\frac{207.26}{273.12 + T} + 0.5533$$

$$R^2 = 0.997$$

wherein: $R^2$ is the correlation constant;

(F) Calculate Comonomer Distribution Index from the total weight fraction with a comonomer content ranging from $0.5^*C_{median}$ to $1.5^*C_{median}$, and if $T_{median}$ is higher than 98.0° C., Comonomer Distribution Index is defined as 0.95;

(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C., in the case of a well-defined bimodal distribution where the difference in the peak temperatures is equal to or greater than the 1.1 times of the sum of half width of each peak, the half width of the inventive ethylene-based polymer composition is calculated as the arithmetic average of the half width of each peak;

(H) Calculate the standard deviation of temperature (Stdev) according the following Equation:

$$Stdev = \sqrt{\sum_{35.0}^{119.0} (T - T_p)^2}$$

An example of a comonomer distribution profile is shown in FIG. 23 of EP 2571690, which is incorporated herein by reference.

Differential Scanning calorimetry (DSC)

Differential Scanning calorimetry (DSC) is used to measure the melting and crystallization behavior of a polymer over a wide range of temperatures. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (approx. 25° C.). The film sample is formed by pressing a "0.1 to 0.2 gram" sample at 175° C. at 1,500 psi, and 30 seconds, to form a "0.1 to 0.2 mil thick" film. A 3-10 mg, 6 mm diameter specimen is extracted from the cooled polymer, weighed, placed in a light aluminum pan (ca 50 mg), and crimped shut. Analysis is then performed to determine its thermal properties. The thermal behavior of the sample is determined by ramping the sample temperature up and down to create a heat flow versus temperature profile. First, the sample is rapidly heated to 180° C., and held isothermal for five minutes, in order to remove its thermal history. Next, the sample is cooled to −40° C., at a 10° C./minute cooling rate, and held isothermal at −40° C. for five minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature (Tm), peak crystallization temperature (Tc), heat of fusion (Hf) (in Joules per gram), and the calculated % crystallinity for polyethylene samples using: % Crystallinity=((Hf)/(292 J/g))×100. The heat of fusion (Hf) and the peak melting temperature are reported from the second heat curve. Peak crystallization temperature is determined from the cooling curve.

Melt Strength

Melt strength may be measured at 190° C. using a Göettfert Rheotens 71.97 (Göettfert Inc.; Rock Hill, S.C.), melt fed with a Göettfert Rheotester 2000 capillary rheometer equipped with a flat entrance angle (180 degrees) of length of 30 mm and diameter of 2.0 mm. The pellets (20-30 gram pellets) are fed into the barrel (length=300 mm, diameter=12 mm), compressed and allowed to melt for 10 minutes before being extruded at a constant piston speed of 0.265 mm/s, which corresponds to a wall shear rate of 38.2 $s^{-1}$ at the given die diameter. The extrudate passes through the wheels of the Rheotens located 100 mm below the die exit and is pulled by the wheels downward at an acceleration rate of 2.4 mm/s². The force (in cN) exerted on the wheels is recorded as a function of the velocity of the wheels (in mm/s). Melt strength is reported as the plateau force (cN) before the strand broke.

Creep Zero Shear Viscosity Measurement Method

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures.

At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ s$^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of ε vs. t, where ε is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio (ZSVR) is defined as the ratio of the zero-shear viscosity (ZSV) of the branched polyethylene material to the ZSV of the linear polyethylene material at the equivalent weight average molecular weight (Mw-gpc) according to the following Equation:

$$ZSVR = \frac{\eta_{0B}}{\eta_{0L}} = \frac{\eta_{0B}}{2.29 \times 10^{-15} M_{w\text{-}gpc}^{3.65}}$$

The ZSV value is obtained from creep test at 190° C. via the method described above. The Mw-gpc value is determined by the conventional GPC method. The correlation between ZSV of linear polyethylene and its Mw-gpc was established based on a series of linear polyethylene reference materials. A description for the ZSV-Mw relationship can be found in the ANTEC proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891.

$^1$H NMR Method 3.26 g of stock solution is added to 0.133 g of polyolefin sample in 10 mm NMR tube. The stock solution is a mixture of tetrachloroethane-d$_2$ (TCE) and perchloroethylene (50:50, w:w) with 0.001M Cr$^{3+}$. The solution in the tube is purged with N$_2$ for 5 minutes to reduce the amount of oxygen. The capped sample tube is left at room temperature overnight to swell the polymer sample. The samples are dissolved at 115° C. with shaking. The samples are free of the additives that may contribute to unsaturation, e.g. slip agents such as erucamide.

The $^1$H NMR is run with a 10 mm cryoprobe at 120° C. on Bruker AVANCE 400 MHz spectrometer. Two experiments are run to get the unsaturation: the control and the double pre-saturation experiments.

For the control experiment, the data is processed with exponential window function with LB=1 Hz, baseline was corrected from 7 to −2 ppm. The signal from residual $^1$H of TCE is set to 100, the integral I$_{total}$ from −0.5 to 3 ppm is used as the signal from whole polymer in the control experiment. The number of CH$_2$ group, NCH$_2$, in the polymer is calculated as following:

$$NCH_2 = I_{total}/2$$

Figure 1:
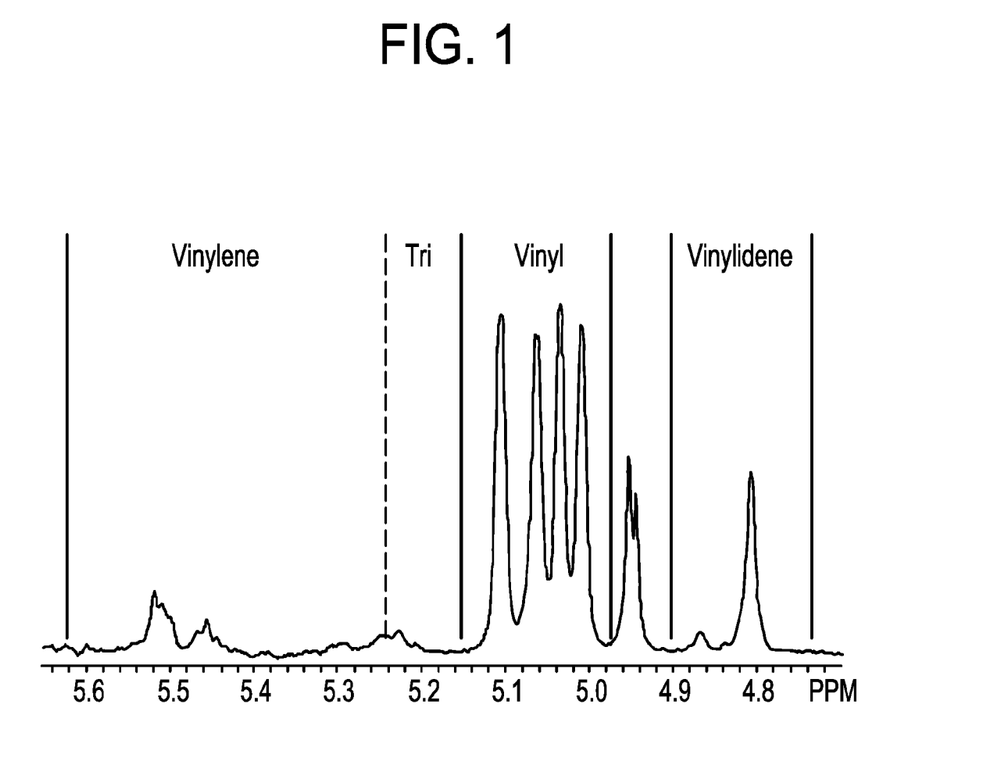
FIG. 1 graphically depicts the regions for unsaturations.

For the double presaturation experiment, the data is processed with exponential window function with LB=1 Hz, baseline was corrected from 6.6 to 4.5 ppm. The signal from residual $_1$H of TCE is set to 100, the corresponding integrals for unsaturations (I$_{vinylene}$, I$_{trisubstituted}$, I$_{vinyl}$ and I$_{vinylidene}$) were integrated based on the region shown in FIG. 1.

The number of unsaturation unit for vinylene, trisubstituted, vinyl and vinylidene are calculated:

$$N_{vinylene} = I_{vinylene}/2$$

$$N_{trisubstituted} = I_{trisubstituted}$$

$$N_{vinyl} = I_{vinyl}/2$$

$$N_{vinylidene} = I_{vinylidene}/2$$

The unsaturation unit/1,000,000 carbons is calculated as following:

$$N_{vinylene}/1,000,000C = (N_{vinylene}/NCH_2)*1,000,000$$

$$N_{trisubstituted}/1,000,000C = (N_{trisubstituted}/NCH_2)*1,000,000$$

$$N_{vinyl}/1,000,000C = (N_{vinyl}/NCH_2)*1,000,000$$

$$N_{vinylidene}/1,000,000C = (N_{vinylidene}/NCH_2)*1,000,000$$

The requirement for unsaturation NMR analysis includes: level of quantitation is 0.47±0.02/1,000,000 carbons for Vd2 with 200 scans (less than 1 hour data acquisition including time to run the control experiment) with 3.9 wt. % of sample (for Vd2 structure, see Macromolecules, vol. 38, 6988, 2005), 10 mm high temperature cryoprobe. The level of quantitation is defined as signal to noise ratio of 10.

The chemical shift reference is set at 6.0 ppm for the $^1$H signal from residual proton from TCT-d2. The control is run with ZG pulse, TD 32768, NS 4, DS 12, SWH 10,000 Hz, AQ 1.64 s, D1 14 s. The double presaturation experiment is run with a modified pulse sequence, O1P 1.354 ppm, O2P 0.960 ppm, PL9 57 db, PL21 70 db, TD 32768, NS 200, DS 4, SWH 10,000 Hz, AQ 1.64s, D1 1 s, D13 13s. The modified pulse sequences for unsaturation with Bruker AVANCE 400 MHz spectrometer are shown below:

```
;lc1prf2_zz
prosol relations=<lcnmr>
# include <Avance.incl>
"d12=20u"
"d11=4u"
1 ze
d12 pl21:f2
2 30m
d13
d12 pl9:f1
d1 cw:f1 ph29 cw:f2 ph29
d11 do:f1 do:f2
d12 pl1:f1
``` p1 ph1
go=2 ph31
30m mc #0 to 2 F0(zd)
exit
ph1=0 2 2 0 1 3 3 1
ph29=0
ph31=0 2 2 0 1 3 3 1

Tensile Properties

Tensile properties, including yield tensile strength, young's modulus, 2% secant modulus, ultimate tensile strength, and ultimate elongation are determined in the machine and cross directions according to ASTM D882 using an Instron Universal Tester.

Tear Strength

Tear strength is measured according to ASTM D-1922.

Shrink at 120° C. & 130° C.

Shrink at 120° C. and 130° C. is measured in the machine direction and cross direction according to ASTM D-2732.

Examples

The resins used in the films are shown below in Table 1. Additives used include a polymer processing aid ("PPA"), AMPACET™ 102823 BA; a slip agent ("Slip"), AMPACET™ 901021 BX; and an antiblock agent ("AB"), AMPACET™ 901300 BX.

TABLE 1

| | | | Resins | | | | |
|---|---|---|---|---|---|---|---|
| | ELITE AT ™ 6101 | AFFINITY ™ PL 1888G | Inv. Resin 1 | Dow LLDPE 1613.11 | DOWLEX ™ 2050B | ATTANE ™ 4203G | Dow LDPE 132i |
| Density (g/cm$^3$) | 0.905 | 0.904 | 0.905 | 0.923 | 0.950 | 0.905 | 0.921 |
| Melt Index, I2 (g/10 min) | 0.8 | 1.0 | 0.5 | 1.3 | 0.95 | 0.8 | 0.25 |
| I10/I2 | 8 | 9.5 | 8.4 | 8.2 | | 8.7 | |
| Mw (g/mole) | 106430 | 91980 | 118060 | | | 132180 | |
| Mn (g/mole) | 38630 | 35720 | 35660 | | | 26910 | |
| Mw/Mn (MWD) | 2.755 | 2.575 | 3.310 | | | 4.912 | |
| Vicat Softening Point (° C.) | 95 | 85 | 96 | | | 98 | 96 |
| Peak Melting Point Temp. (° C.) | 101 | 98 | 102 | | | 123 | 110 |
| CDC | 107.4 | 68.9 | 113.8 | | | 88.3 | |

All resins, except for inventive resin 1, are commercially available from The Dow Chemical Company (Midland, Mich.).

Inventive Resin 1 may be made as follows: all raw materials (monomer and comonomer) and the process solvent (a narrow boiling range high-purity isoparaffinic solvent, Isopar-E) are purified with molecular sieves before introduction into the reaction environment. Hydrogen is supplied pressurized as a high purity grade and is not further purified. The reactor monomer feed stream is pressurized via a mechanical compressor to above reaction pressure. The solvent and comonomer feed is pressurized via a pump to above reaction pressure. The individual catalyst components are manually batch diluted with purified solvent and pressured to above reaction pressure. All reaction feed flows are measured with mass flow meters and independently controlled with computer automated valve control systems.

A two reactor system may be used in a series configuration. Each continuous solution polymerization reactor consists of a liquid full, non-adiabatic, isothermal, circulating, loop reactor which mimics a continuously stirred tank reactor (CSTR) with heat removal. Independent control of all fresh solvent, monomer, comonomer, hydrogen, and catalyst component feeds is possible. The total fresh feed stream to each reactor (solvent, monomer, comonomer, and hydrogen) is temperature controlled to maintain a single solution phase by passing the feed stream through a heat exchanger. The total fresh feed to each polymerization reactor is injected into the reactor at two locations with approximately equal reactor volumes between each injection location. The fresh feed is controlled with each injector receiving half of the total fresh feed mass flow. The catalyst components are injected into each polymerization reactor through specially designed injection stingers. The primary catalyst component feed is computer controlled to maintain each reactor monomer conversion at the specified targets. The cocatalyst components are fed based on calculated specified molar ratios to the primary catalyst component. Immediately following each reactor feed injection location, the feed streams are mixed with the circulating polymerization reactor contents with static mixing elements. The contents of each reactor are continuously circulated through heat exchangers responsible for removing much of the heat of reaction and with the temperature of the coolant side responsible for maintaining an isothermal reaction environment at the specified temperature. Circulation around each reactor loop is provided by a pump.

The effluent from the first polymerization reactor (containing solvent, monomer, comonomer, hydrogen, catalyst components, and polymer) exits the first reactor loop and is added to the second reactor loop.

The final reactor effluent (second reactor effluent for dual series configuration) enters a zone where it is deactivated with the addition of and reaction with a suitable reagent (water). At this same reactor exit location other additives are added for polymer stabilization (e.g., antioxidants suitable for stabilization during extrusion and blown film fabrication).

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted comonomer is recycled back to the reactor system after passing through a purification system. A small amount of solvent and comonomer is purged from the process.

Figure 2:
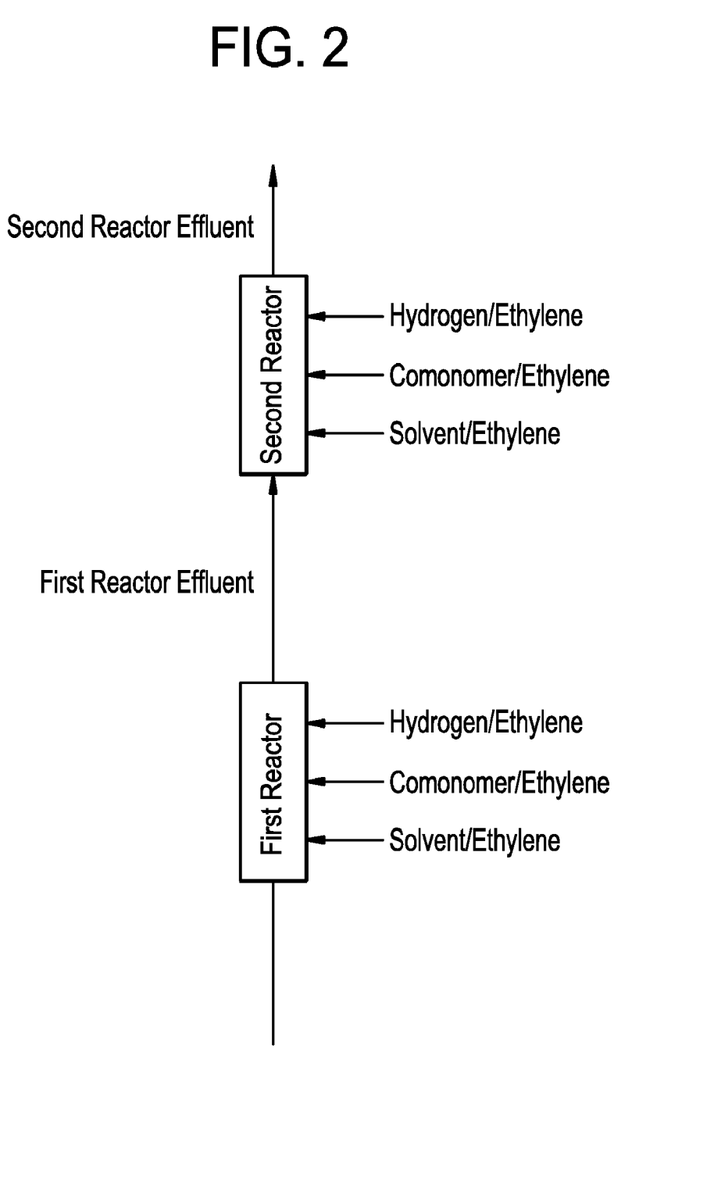
FIG. 2 pictorially depicts a flow diagram of reactor stream feed data flows of an ethylene/alpha-olefin interpolymer composition according to one or more embodiments described herein.

The reactor stream feed data flows that correspond to the values in Table 2, which may be used to produce inventive resin 1, are graphically described in FIG. 2. The data is presented such that the complexity of the solvent recycle system is accounted for and the reaction system can be treated more simply as a once through flow diagram.

TABLE 2

|  |  | Inventive Resin 1 |
|---|---|---|
| Reactor Configuration | Type | Dual Series |
| Comonomer type | Type | 1-octene |
| First Reactor Feed Solvent/Ethylene Mass Flow Ratio | g/g | 5.3 |
| First Reactor Feed Comonomer/Ethylene Mass Flow Ratio | g/g | 0.65 |
| First Reactor Feed Hydrogen/Ethylene Mass Flow Ratio | g/g | 2.0E−04 |
| First Reactor Temperature | °C. | 141 |
| First Reactor Pressure | barg | 50 |
| First Reactor Ethylene Conversion | % | 79.2 |
| First Reactor Catalyst Type | Type | Catalyst component 1 |

TABLE 2-continued

|  |  | Inventive Resin 1 |
|---|---|---|
| First Reactor Co-Catalyst 1 Type | Type | Co-Catalyst 1 |
| First Reactor Co-Catalyst 2 Type | Type | Co-Catalyst 2 |
| First Reactor Co-Catalyst 1 to Catalyst Molar Ratio (B to Zr ratio) | Ratio | 2.0 |
| First Reactor Co-Catalyst 2 to Catalyst Molar Ratio (Al to Zr ratio) | Ratio | 74.1 |
| First Reactor Residence Time | min | 17.2 |
| Second Reactor Feed Solvent/Ethylene Mass Flow Ratio | g/g | 2.5 |
| Second Reactor Feed Comonomer/Ethylene Mass Flow Ratio | g/g | 0.186 |
| Second Reactor Feed Hydrogen/Ethylene Mass Flow Ratio | g/g | 3.0E−04 |
| Second Reactor Temperature | °C. | 190 |
| Second Reactor Pressure | barg | 50 |
| Second Reactor Ethylene Conversion | % | 85.9 |
| Second Reactor Catalyst Type | Type | Catalyst component 1 |
| Second Reactor Co-Catalyst 1 Type | Type | Co-Catalyst 1 |
| Second Reactor Co-Catalyst 2 Type | Type | Co-Catalyst 2 |
| Second Reactor Co-Catalyst 1 to Catalyst Molar Ratio (B to Zr ratio) | mol/mol | 1.4 |
| Second Reactor Co-Catalyst 2 to Catalyst Molar Ratio (Al to Zr ratio) | mol/mol | 7.0 |
| Second Reactor Residence Time | min | 7.3 |

TABLE 3

| Catalyst component 1 | Zirconium,dimethyl[[2,2'''-[1,3-propanediylbis(oxy-κO)]bis[3''',5,5''-tris(1,1-dimethylethyl)-5'-methyl[1,1':3',1''-terphenyl]-2'-olato-κO]](2-)]- |
|---|---|
| Co-catalyst 1 | Amines, bis(hydrogenated tallow alkyl)methyl,tetrakıs(pentafluorophenyl)borate(1-) |
| Co-catalyst 2 | modified methyl aluminoxane |

TABLE 4

| | Film Formulations | | | |
|---|---|---|---|---|
| | Layers formulation | | | |
| Samples | First Skin Layer "A" (25%) | At Least One Core Layer "B" (50%) | Second Skin Layer "A" (25%) | Overall Film Formulation |
| Comparative Film 1 | 100% ELITE AT ™ 6101 | 100% ELITE AT ™ 6101 | 100% ELITE AT ™ 6101 | 100% ELITE AT ™ 6101 |
| Comparative Film 2 | 60% LDPE 132I + 40% LLDPE 1613.11 | 50% LDPE 132I + 49% ELITE AT ™ 6101 + 1% PPA | 60% LDPE 132I + 40% LLDPE 1613.11 | 55% LDPE 132I + 25% ELITE AT ™ 6101 + 20% LLDPE 1613.11 + 0.5% PPA |
| Comparative Film 3 | 60% LDPE 132I + 40% LLDPE 1613.11 | 50% LDPE 132I + 49% AFFINITY PL ™ 1888G + 1% PPA | 60% LDPE 132I + 40% LLDPE 1613.11 | 55% LDPE 132I + 25% AFFINITY PL ™ 1888G + 20% LLDPE 1613.11 + 0.5% PPA |
| Comparative Film 4 | 60% LDPE 1321 + 40% LLDPE 1613.11 | 50% LDPE 132I + 49% ATTANE ™ 4203G + 1% PPA | 60% LDPE 132I + 40% LLDPE 1613.11 | 55% LDPE 132I + 25% ATTANE ™ 4203G + 20% LLDPE 1613.11 + 0.5% PPA |
| Comparative Film 5 | 60% LDPE 132I + 40% LLDPE 1613.11 | 50% LDPE 132I + 25% LLDPE 1613.11 + 25% DOWLEX ™ 2050B | 60% LDPE 132I + 40% LLDPE 1613.11 | 55% LDPE 132I + 32.5% LLDPE 1613.11 + 12.5% DOWLEX ™ 2050B |

TABLE 4-continued

Film Formulations

| Samples | First Skin Layer "A" (25%) | At Least One Core Layer "B" (50%) | Second Skin Layer "A" (25%) | Overall Film Formulation |
|---|---|---|---|---|
| Inventive Film 1 | 60% LDPE 132I + 33% ELITE AT ™ 6101 + 5% AB + 1% PPA + 1% Slip | 50% LDPE 132I + 49% ELITE AT ™ 6101 + 1% PPA | 60% LDPE 132I + 33% ELITE AT ™ 6101 + 5% AB + 1% PPA + 1% Slip | 55% LDPE 132I + 41% ELITE AT ™ 6101 + 2.5% AB + 1% PPA + 0.5% Slip |
| Inventive Film 2 | 50% LDPE 132I + 43% ELITE AT ™ 6101 + 5% AB + 1% PPA + 1% Slip | 40% LDPE 132I + 59% ELITE AT ™ 6101 + 1% PPA | 50% LDPE 132I + 43% ELITE AT ™ 6101 + 5% AB + 1% PPA + 1% Slip | 45% LDPE 132I + 51% ELITE AT ™ 6101 + 2.5% AB + 1% PPA + 0.5% Slip |
| Inventive Film 3 | 40% LDPE 132I + 53% ELITE AT ™ 6101 + 5% AB + 1% PPA + 1% Slip | 30% LDPE 132I + 69% ELITE AT ™ 6101 + 1% PPA | 40% LDPE 132I + 53% ELITE AT ™ 6101 + 5% AB + 1% PPA + 1% Slip | 35% LDPE 132I + 61% ELITE AT ™ 6101 + 2.5% AB + 1% PPA + 0.5% Slip |
| Inventive Film 4 | 60% LDPE 132I + 33% Inv. Resin 1 + 5% AB + 1% PPA + 1% Slip | 50% LDPE 132I + 49% Inv. Resin 1 + 1% PPA | 60% LDPE 132I + 33% Inv. Resin 1 + 5% AB + 1% PPA + 1% Slip | 55% LDPE 132I + 41% Inv. Resin 1 + 2.5% AB + 1% PPA + 0.5% Slip |
| Inventive Film 5 | 50% LDPE 132I + 43% Inv. Resin 1 + 5% AB + 1% PPA + 1% Slip | 40% LDPE 132I + 59% Inv. Resin 1 + 1% PPA | 50% LDPE 132I + 43% Inv. Resin 1 + 5% AB + 1% PPA + 1% Slip | 45% LDPE 132I + 51% Inv. Resin 1 + 2.5% AB + 1% PPA + 0.5% Slip |
| Inventive Film 6 | 40% LDPE 132I + 53% Inv. Resin 1 + 5% AB + 1% PPA + 1% Slip | 30% LDPE 132I + 69% Inv. Resin 1 + 1% PPA | 40% LDPE 132I + 53% Inv. Resin 1 + 5% AB + 1% PPA + 1% Slip | 35% LDPE 132I + 61% Inv. Resin 1 + 2.5% AB + 1% PPA + 0.5% Slip |

Film Process

Comparative Film 1: A three layer film is produced on a Reifenhauser, 3 layer, 3 extruder blown film line. The film structure is outlined in Table 4. The blown film line parameters are shown in Table 5A.

TABLE 5A

| Blown Film Line Parameters | |
|---|---|
| Thickness | 50 μm |
| BUR | 2.5:1 |
| Output (kg/hr) | 120 kg/hr (A extruder: 26 kg/hr; B extruder 69 kg/hr; C extruder 25 kg/hr) |
| Screw Diameter (mm) | 70/96/70 (for extruders A/B/C) |
| Haul-Off Speed (m/min) | 23 |
| Die diameter (mm) | 250 |
| Die gap (mm) | 2.4 |
| Die head/temp (° C.) | 211° C.-210° C.-210° C.-206° C. |
| Melt Temperature (° C.) | A extruder: 211° C.-210° C.-212° C.-201° C.-201° C.-202° C.-191° C.-180° C.; B extruder: 209° C.-214° C.-211° C.-203° C.-200° C.-190° C.-181° C.; C extruder: 210° C.-210° C.-211° C.-201° C.-201° C.-202° C.-191° C.-180° C. |
| Motor Current (A) | A extruder: 69; B extruder: 95; C extruder: 70 |
| Screw Speed (rpm) | A extruder: 29; B extruder: 34; C extruder: 28 |

TABLE 5A-continued

| Blown Film Line Parameters | |
|---|---|
| Melt Pressure (bar) | A extruder: 320 bar; B extruder: 211 bar; C extruder: 362 bar |

Comparative Films 2-5 and Inventive Films 1-6: Three layer blown films are produced on a Jundiai lab 5 layer, 5 line extruder blown film line. To produce 3 layer films, the same formulation is in the 3 core layers. The layer distribution is A/B/B/B/A (25%/15%/20%/15%/25%). and have a film structure as outlined above in Table 4. The blown film line parameters are shown in Table 5B.

TABLE 5B

| Blown Film Line Parameters | |
|---|---|
| Thickness | 50 μm |
| BUR | 3:1 |
| Layer Distribution | 25-50-25 |
| Output | 15 kg/h |
| Cooling Air T ° | 12° C. |
| Die Gap | 1.8 mm |
| Die T ° | 235° C. |
| T ° Profile for layers 1, 2, 4, and 5 | 195° C.-225° C.-235° C.-235° C.-235° C. |
| T ° Profile for layer 3 | 180° C.-190° C.-220° C.-220° C.-220° C. |

The properties of the films are measured and shown below in Tables 6A & 6B.

TABLE 6A

Comparative Film Properties

| Property | Units | Comp. Film 1 | Comp. Film 2 | Comp. Film 3 | Comp. Film 4 | Comp. Film 5 |
|---|---|---|---|---|---|---|
| Shrink @ 120° C. (MD) | % | 72.0 | 30.0 | 23.2 | 23.2 | 2.0 |
| Shrink @ 130° C. (MD) | % | — | 40.0 | 61.6 | 56.4 | 30.0 |
| Shrink @ 120° C. (CD) | % | −5.0 | 0 | 0 | 0 | 0 |
| Shrink @ 130° C. (CD) | % | — | 15.0 | 20.0 | 10.8 | 5.0 |
| Yield Tensile Strength, MD/CD | MPa | — | 7.38/7.36 | 7.44/7.40 | 6.82/6.57 | 10.13/11.29 |
| Young Modulus, MD/CD | MPa | — | 414/421 | 425/471 | 445/511 | 679/792 |
| 2% Secant Modulus, MD/CD | MPa | — | 243/243 | 236/245 | 244/273 | 372/418 |
| Ultimate Tensile Strength, MD/CD | MPa | — | 27.3/28.4 | 24.0/27.2 | 25.4/27.4 | 24.6/25.9 |
| Ultimate Elongation, MD/CD | % | — | 586/720 | 584/775 | 600/740 | 620/784 |
| Tear Strength, MD/CD | g | — | 279/719 | 239/716 | 291/950 | 181/613 |

TABLE 6B

Inventive Film Properties

| Property | Units | Inv. Film 1 | Inv. Film 2 | Inv. Film 3 | Inv. Film 4 | Inv. Film 5 | Inv. Film 6 |
|---|---|---|---|---|---|---|---|
| Shrink @ 120° C. (MD) | % | 50.0 | 50.0 | 50.0 | 50.0 | 50.0 | 50.0 |
| Shrink @ 130° C. (MD) | % | 50.0 | 52.0 | 50.0 | 54.5 | 50.5 | 53.0 |
| Shrink @ 120° C. (CD) | % | 10.0 | 12.0 | 9.5 | 10.0 | 10.0 | 10.0 |
| Shrink @ 130° C. (CD) | % | 20.5 | 24.5 | 19.5 | 21.5 | 18.0 | 12.5 |
| Yield Tensile Strength, MD/CD | MPa | 7.20/6.95 | 7.41/7.17 | 7.07/6.75 | 7.75/7.43 | 6.93/6.99 | 7.33/6.33 |
| Young Modulus, MD/CD | MPa | 345/375 | 334/357 | 310/322 | 373/393 | 336/356 | 294/309 |
| 2% Secant Modulus, MD/CD | MPa | 214/225 | 208/214 | 194/196 | 233/233 | 209/217 | 188/189 |
| Ultimate Tensile Strength, MD/CD | MPa | 28.0/29.6 | 29.6/32.1 | 31.8/35.9 | 30.0/31.1 | 26.6/34.3 | 33.6/35.3 |
| Ultimate Elongation, MD/CD | % | 700/743 | 680/777 | 762/807 | 643/760 | 616/797 | 692/726 |
| Tear Strength, MD/CD | g | 298/727 | 371/808 | 383/879 | 260/858 | 365/916 | 473/919 |

The results show that inventive films 1-6 have improved shrinkage at lower temperatures as compared to the comparative films. Also, the results show comparable or improved tensile properties for the inventive films 1-6 as compared to the comparative films.

We claim:

1. A multilayer shrink film comprising:
a first skin layer comprising 25 to 60 wt. %, based on the total polymer weight in the first skin layer, of an ethylene/α-olefin interpolymer composition having a density in the range of from 0.890 g/cc to 0.915 g/cc, a melt index (I2) in a range of from 0.1 to 5 g/10 minutes, a molecular weight distribution (Mw/Mn) in the range of from 1.8 to 3.5, and a Comonomer Distribution Constant (CDC) in the range of from 95 to 200;
at least one core layer comprising from 15 to 65 wt. %, based on the total polymer weight in the at least one core layer, of an ethylene/α-olefin interpolymer composition having a density in the range of from 0.890 g/cc to 0.915 g/cc, a melt index (I2) in a range of from 0.1 to 5 g/10 minutes, a molecular weight distribution (Mw/Mn) in the range of from 1.8 to 3.5, and a Comonomer Distribution Constant (CDC) in the range of from 95 to 200; and
a second skin layer comprising from 25 to 60 wt. %, based on the total polymer weight in the second skin layer, of an ethylene/α-olefin interpolymer composition having a density in the range of from 0.890 g/cc to 0.915 g/cc, a melt index (I2) in a range of from 0.1 to 5 g/10 minutes, a molecular weight distribution (Mw/Mn) in the range of from 1.8 to 3.5, and a Comonomer Distribution Constant (CDC) in the range of from 95 to 200;

wherein the at least one core layer is positioned between the first skin layer and the second skin layer;

wherein the wt. % amount of the ethylene/alpha-olefin interpolymer composition present in the first skin layer is different from the wt. % amount of the ethylene/alpha-olefin interpolymer composition present in the core layer, and the wt. % amount of the ethylene/alpha-olefin interpolymer composition present in the second skin layer is different from the wt. % amount of the ethylene/alpha-olefin interpolymer composition present in the core layer;

wherein the multilayer shrink film comprises from 25 wt. % to 75 wt. %, based on the total weight of polymers present in the multilayer shrink film, of the ethylene/alpha-olefin interpolymer composition; and wherein the multilayer shrink film further comprises from 30 to 55 wt. %, based on the total weight of polymers present in the multilayer shrink film, of a low density polyethylene polymer having a density from 0.910 to 0.930 g/cc and an I2 from 0.1 to 10 g/10 min.

2. The multilayer shrink film according to claim 1, wherein the ethylene/α-olefin interpolymer composition present in the first skin layer, the at least one core layer, and the second skin layer has a vinyl unsaturation of less than 0.15 vinyls per one thousand carbon atoms present in the ethylene/α-olefin interpolymer composition; and a zero shear viscosity ratio (ZSVR) in the range from 2 to 20.

3. The multilayer shrink film according to claim 1, wherein the ethylene/α-olefin interpolymer present in the first skin layer, the at least one core layer, and the second skin layer has an I10/I2 from 6 to 12.

4. The multilayer shrink film according to claim 1, wherein the first skin layer and the second skin layer independently have a thickness that is from 5-35 percent of the overall thickness of the multilayer shrink film.

5. The multilayer shrink film according to claim 1, wherein the at least one core layer has a thickness that is from 30-90 percent of the overall thickness of the multilayer shrink film.

6. The multilayer shrink film according to claim 1, wherein the film has an overall thickness ranging from 20 to 100 microns.

7. The multilayer shrink film according to claim 1, wherein the film exhibits a CD shrinkage higher than 4% at 120° C., according to ASTM D2732.

8. The multilayer shrink film according to claim 1, wherein the film exhibits a CD shrinkage higher than 6% at 120° C., according to ASTM D2732.

9. The multilayer shrink film according to claim 1, wherein the film further comprises one or more additives selected from the group consisting of antiblocking agents, processing aids, slip agents, colors or pigments, and fillers.

* * * * *